United States Patent Office 3,634,292
Patented Jan. 11, 1972

3,634,292
REGENERATION OF A COKE-DEACTIVATED
CATALYST COMPRISING A COMBINATION
OF PLATINUM, RHENIUM, AND HALOGEN
WITH AN ALUMINA CARRIER MATERIAL
John C. Hayes, Palatine, Ill., assignor to Universal Oil
Products Company, Des Plaines, Ill.
No Drawing. Filed Feb. 6, 1969, Ser. No. 797,272
Int. Cl. B01j 11/02, 11/80; C10g 35/06
U.S. Cl. 252—415                                    13 Claims

ABSTRACT OF THE DISCLOSURE

A deactivated hydrocarbon conversion catalyst, which is a combination of a platinum group component, a rhenium component, and a halogen component with an alumina carrier material and which has been deactivated by a deposition of carbonaceous materials thereon during a previous contacting with a hydrocarbon charge stock at an elevated temperature, is regenerated by the sequential steps of: (1) burning carbon therefrom at a relatively low temperature with a gas stream containing $H_2O$ and a small amount of $O_2$, (2) contacting at a relatively high temperature with a gas stream containing $H_2O$ and a small amount of $O_2$, (3) treating at a relatively high temperature with a gas stream containing $H_2O$ and a large amount of $O_2$, (4) treating with a gas stream containing halogen or a halogen-containing compound and water, and (5) reducing with a dry hydrogen stream. Key features of the resulting method are: (1) presence of water in the gas stream used in all steps except the reduction step, (2) careful control of the temperature during each step, (3) adjustment of halogen content of the catalyst prior to the reduction step, and (4) careful control over the composition of the gas streams used in the various steps thereof.

The subject of the present invention is a method for regenerating a coke-deactivated hydrocarbon conversion catalyst comprising a platinum group component, a rhenium component, and a halogen component combined with an alumina carrier material. More specifically, the present invention is a method for regenerating a deactivated hydrocarbon conversion catalyst comprising a combination of platinum, rhenium and halogen with an alumina carrier material where the catalyst has been deactivated by the deposition of carbonaceous materials thereon during a previous contacting with a hydrocarbon charge stock at an elevated temperature. In essence, the present invention provides a specific sequence of carbon burning and catalyst treatment steps designed to result in a regenerated catalyst prossessing activity, selectivity, and stability characteristics which are comparable to those observed with the fresh undeactivated catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the metals or compounds of metals of Group V through VIII of the Periodic Table to which are generally attributed the hydrogenation dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commerical applications of these catalysts are in processes where more than one of these reactions are proceeding simultaneously. An example of this type of process is reforming wherein a hydrocarbon feed stream containing paraffins and naphthenes is subjected to conditions which promote dehydrogeneration of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or in the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the weight percent of the reactants that are converted into the desired product and/or products; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield that is obtained at the particular severity level; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperature, and changes in this last parameter are customarily taken as indicative of activity and stability.

As is well known to those skilled in the art, the principal cause of observed deactivation or instability of these dual-function catalysts when they are used in a hydrocarbon conversion reaction is associated with the formation of coke or carbonaceous materials on the surface of the catalyst during the course of the reaction. More specifically, the conditions utilized in these hydrocarbon conversion processes typically result in the formation of heavy, black, solid or semi-solid carbonaceous material which deposit on the surface of the catalyst and gradually reduce its activity by shielding its active sites from the reactants. Recently, there has been developed a new dual-function catalytic composite which possesses improved activity, selectivity, and stability characteristics when it is employed in a process for the conversion of hydrocarbons of the type which has heretofore utilized dual-function catalytic composites such as processes for isomerization, dehydrogenation, hydrogenation, alkylation, transalkylation, dealkylation, cyclization, dehydrocyclization, cracking, hydrocracking, reforming, and the like processes. In particular, it has been determined that a combination of a platinum group component, a rhenium component, and a halogen component with an alumina carrier material enables the performance of hydrocarbon conversion processes utilizing dual-function catalysts to be substantially improved. For example, it has been demonstrated that the overall performance characteristics of a reforming process can be sharply improved by the use of this recently developed catalytic composite. Not unexpectedly, the deactivation of this recently developed dual-function hydrocarbon conversion catalyst occurs in much the same manner as for any other hydrocarbon conversion catalyst having a platinum metal component when it is employed in the hydrocarbon conversion service. Accordingly, the principal mode of deactivation of this recently developed catalyst is the deposition of coke, volatile hydrocarbons, and other carbonaceous material on the surface of the catalyst which eventually cover the catalytically active sites of the catalyst, thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing the catalyst, at some point in time the catalyst becomes so clogged with carbonaceous materials that it either must be regenerated or discarded. Heretofore, substantial difficulty has been encountered in regenerating this recently developed hydrocarbon conversion catalyst. More specifically, it has been determined that the application of conventional regeneration techniques which have been practiced in the art of regenerating dual-function hydrocarbon conversion catalysts, has not been successful in restoring the initial activity, selectivity, and stability characteristics of the catalyst. Typically, the application of conventional carbon-burning procedure with oxygen-containing gases results in a regenerated catalyst having an extremely low activity and containing a reduced amount of halogen component. Attempts at restoring the initial level of halogen contained in the catalyst by well known halogen adjustment procedures on the regenerated catalyst have not been successful. Accordingly, the problem addressed by the present invention is the regeneration of a hydrocarbon conversion catalyst comprising a combination of a platinum group component, a rhenium component, and a halogen component with an alumina carrier material.

The concept of the present invention was facilitated by my recognition that the adverse effects that have heretofore been commonly encountered in attempts to regenerate this catalyst by conventional oxygen burning techniques were caused by a failure to carefully control the composition of the gas streams used in the various steps of the regeneration method coupled with a failure to carefully control the temperature used in each of the steps of the regeneration procedure. I have now found a specific sequence of steps which enable the successful regeneration of this recently developed hydrocarbon conversion catalyst, and essential features of my method are: careful control of the temperature throughout the regeneration steps, the presence of water in all steps except the reduction step, adjustment of the halogen component after removal of carbonaceous material from the catalyst but prior to the reduction step, and careful control of the composition of the gas streams used in all steps to insure the absence of detrimental constituents.

It is, therefore, a principal object of the present invention to provide a method for regenerating a hydrocarbon conversion catalyst comprising a combination of a platinum group component, a rhenium component, and a halogen component with an alumina carrier material which catalyst has been deactivated by contact with a hydrocarbon charge stock at elevated temperatures. A corollary object is to provide a solution to the problem of regenerating these recently developed catalysts which solution enables the substantial restoration of the activity, selectivity, and stability characteristics of the original catalyst. An overall object is to extend the total catalyst life of these recently developed catalysts and to obtain more efficient and effective use of these catalysts during their active life.

In brief summary, the present invention is a method for regenerating a deactivated hydrocarbon conversion catalyst comprising a combination of a platinum group component, a rhenium component, and a halogen component with an alumina carrier material—the catalyst having been deactivated by deposition of carbonaceous materials thereon during a previous contacting with a hydrocarbon charge stock at elevated temperatures. The first step of the method comprises contacting the deactivated catalyst with a first gaseous mixture consisting essentially of about 0.5 to about 2.0 vol. percent $O_2$, about 0.1 to about 4 vol. percent $H_2O$, and an inert gas at a pressure of about 1 to 7 atm. and at a temperature of about 375 to about 500° C. for a first period sufficient to substantially remove the carbonaceous materials therefrom. Thereafter, the catalyst from the first step is subjected to contact with a second gaseous mixture consisting essentially of about 0.5 to about 2 vol. percent $O_2$, about .1 to about 4 vol. percent $H_2O$, and an inert gas for a second period of about .5 to 5 hours at a temperature of about 500 to about 550° C. and at a pressure of about 1 to about 7 atm. In the third step, the catalyst from the second step is contacted with a third gaseous mixture consisting essentially of about 10 to about 25 vol. percent $O_2$, about .1 to about 4 vol. percent $H_2O$, and an inert gas for a third period of about 1 to 5 hours at a temperature of about 500 to 550° C. and at a pressure of about 1 to about 7 atm. The catalyst from the third step is then, in the fourth step, subjected to contact with a fourth gaseous mixture comprising about 1 to about 30 vol. percent $H_2O$, and about .05 to about 5 vol. percent of a halogen or halogen-containing compound and air or an inert gas for a fourth period of about 1 to about 10 hours at a temperature of about 400 to about 550° C. and at a pressure of about 1 to about 7 atm. Thereafter, oxygen and water are purged from contact with the resulting catalyst by means of an inert gas stream. In the final step, the resulting catalyst is subjected to contact with a substantially water-free hydrogen stream at a temperature of about 400 to about 600° C. for a final period of about .5 to about 5 hours, thereby producing a regenerated hydrocarbon conversion catalyst having activity, selectivity, and stability characteristics comparable to those possessed initially by the fresh catalyst.

Other objects and embodiments of the present invention encompass further details about the catalysts that can be regenerated thereby, the conditions and reagents used in each step of the regeneration method, and the mechanics associated with each of these steps. These embodiments and objects will be hereinafter disclosed in the following detailed description of each of the essential and preferred steps of the present invention.

The present invention encompasses a regeneration method which is applicable to a catalyst containing a platinum group component, a rhenium component, and a halogen component combined with an alumina carrier material. Although the regeneration procedure is specifically directed to the regeneration of a composite containing platinum, it is intended to include within its scope other platinum group metals such as palladium, rhodium, ruthenium, osmium, and iridium. The platinum group component may be present in the catalyst as the elemental metal or as a suitable compound such as the oxide, sulfide, etc., although it is generally preferred that it be used in the reduced state. Generally, the amount of the platinum group metallic component present in the final catalyst is small compared to the quantities of the other components combined therewith. In fact, the platinum group metallic component preferably comprises about 0.01 to about 1.0 wt. percent of the final catalytic composite calculated on an elemental basis. Excellent results are obtained when the catalyst contains about .1 to about 0.9 wt. percent of the platinum group metal.

Another essential constituent of the catalyst regenerated by the method of the present invention is the rhenium component. This component may be present as an elemental metal or as a chemical compound such as the oxide, sulfide, halide, or in a physical or chemical association with the carrier material and/or other components of the catalyst. Generally, the rhenium component is utilized in an amount sufficient to result in the final catalytic composite containing about 0.01 to about 1.0 wt. percent rhenium, calculated as an elemental metal. The rhenium component may be incorporated in the catalytic composite in any simple manner and in any stage of the preparation of the catalyst. The preferred procedure for incorporating the rhenium component involves the impregnation of the alumina carrier material either before, during, or after the other components referred to herein are added. The impregnation solution is generally an aqueous solution of a suitable rhenium salt such as ammonium perrhenate, sodium perrhenate, potassium perrhenate, and the like salts. However, the preferred impregnation solution is an aqueous solution of perrhenic acid. In general, the alumina carrier material can be impregnated with the rhenium component either prior to, simultaneously with, or after the platinum group metallic component is added to the carrier. However, best results are achieved when the rhenium compound is impregnated simultaneously with the platinum group metallic component. In fact, a preferred impregnation solution contains chloroplatinic acid, hydrogen chloride and perrhenic acid.

Another component of the catalyst treated by the method of the present invention is a halogen component. Although the precise form of the chemistry of the association of the halogen component with the alumina support is not entirely known, it is customary in the art to refer to the halogen component as being combined with the alumina carrier material or with the other ingredients of the catalyst. This combined halogen may be either chlorine, fluorine, iodide, bromine, or mixtures thereof. Of these chlorine and fluorine are preferred with the best results obtained with chlorine. The halogen may be added to the alumina carrier material in any suitable manner either during preparation of the support or before or after the addition of the platinum metal and rhenium components. The halogen component is typically combined with the alumina carrier material in amounts sufficient to result in the final catalyst containing about .1 to about 1.5 wt. percent halogen and preferably about 0.4 to about 1.0 wt. percent halogen.

As indicated above, the catalyst that is regenerated by the method of the present invention contains an alumina carrier material. The alumina material is typically a porous absorptive, high surface area support having a surface area of about 25 to about 500 or more m.$^2$/gm. Suitable alumina materials are the crystalline aluminas known as gamma-, eta-, and theta-alumina, with gamma- or eta-alumina giving best results. In addition, in some embodiments the alumina carrier material may contain minor proportions of other well known refractory inorganic oxides such as silica, zirconia, magnesia, etc. However, the preferred carrier material consists essentially of gamma- or eta-alumina; in fact, an especially preferred alumina carrier material has an apprent bulk density of about 0.30 gm./cc. to about 0.70 gm./cc. and surface area characteristics such that the average pore diameter is about 20 to about 300 angstroms, pore volume in about 0.10 to about 1.0 ml./gm. and the surface area is bout 100 to about 500 m.$^2$/gm. An exemplary procedure for preparing a preferred alumina carrier material comprising spherical particles is given in the teachings of U.S. Pat. 2,620,314.

After impregnation of the catalytic components into the alumina carrier material, the resulting composite is typically subjected to a conventional drying step at a temperature of about 200° F. to about 600° F. for a period of about 2 to 24 hours. Thereafter, the dried composite is typically calcined at a temperature of about 700° F. to about 1100° F. in an air stream for a period of about 0.5 to 10 hours. Moreover, conventional pre-reduction and presulfiding treatments are typically performed in the preparation of catalytic composites which are regenerated by the method of the present invention. In fact, it is preferred to incorporate about 0.05 to about 0.5 wt. percent of sulfur component into the subject catalyst by a conventional presulfiding step.

In a preferred embodiment, the catalyst regenerated by the present invention is a combination of a platinum component, a chlorine component and a rhenium component with an alumina carrier material. These components are preferably present in amounts sufficient to result in the catalyst containing, on an elemental basis, about 0.1 to 1.5 wt. percent chlorine, about 0.01 to about 1.0 wt. percent platinum, and about 0.01 to about 1.0 wt. percent rhenium.

As indicated hereinbefore, the principal utility for this type of catalyst is in a hydrocarbon conversion process wherein a dual-function hydrocarbon conversion catalyst having a hydrogenation-dehydrogenation function and an acid-acting function has been traditionally used; for example, these catalysts are used in a reforming process with excellent results. In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50 to about 150° F., and an end boiling point within the range of about 325 to 425° F., or it may be a selective fraction thereof which generally will be a higher boiling fraction commonly referred to as a heavy naphtha—for example, a naphtha boiling in the range of $C_7$ to 400° F. provides an excellent charge stock. In general, the conditions used in the reforming process are: a pressure of about 50 to about 1000 p.s.i.g. with the preferred pressure being 100 to about 600 p.s.i.g., a temperature of about 800 to about 1100° F. and preferably about 900 to about 1050° F., a hydrogen to hydrocarbon mole ratio of about 2 to about 20 moles of $H_2$ per mole of hydrocarbon and preferably about 4 to about 10 moles of $H_2$ per mole of hydrocarbon, and a liquid hourly space velocity (which is defined as the equivalent liquid volume flow rate per hour of the hydrocarbon charge stock divided by the volume of the bed of catalyst particles) of about 0.1 to about 10.0 hr.$^{-1}$, with a value in the range of about 1.0 to about 3.0 hr.$^{-1}$ giving best results.

When the catalysts of the type described above are employed in the conversion of hydrocarbons, particularly the reforming process outlined above, the activity, selectivity, and stability of these catalysts are initially quite acceptable. For example, in a reforming process this type of catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about ½ to about 15 percent by weight of carbonaceous deposits have been formed upon the catalyst.

When the performance of the catalyst has decayed to the point where it is desired to regenerate the catalyst, the introduction of the hydrocarbon charge stock into the conversion zone containing the catalyst is stopped. Thereafter, the regeneration method of the present invention is performed either in situ or the catalyst may be unloaded from the conversion zone and regenerated in an off-line facility.

It is to be carefully noted that it is an essential feature of the subject regeneration methods that the composition of the gas streams used in the various steps thereof are carefully controlled, and the positive requirements for the composition of each of these gas streams are given hereinafter in a manner which excludes the presence of other materials. In particular, it is a critical feature of the present invention that the gas streams used during the carbon-burning step, the oxygen-treating step, and the halogen-adjustment step are substantially free of compounds of sulfur—particularly, oxides of sulfur and $H_2S$. Likewise, it is essential that the hydrogen stream used during the reduction step be substantially free of both water and sulfur compounds such as $H_2S$. It is, therefore, evident that the gas streams used in each of the steps of the present invention may be once-through streams or recycle streams; provided that in this latter case, the recycle streams are carefully controlled to insure that the positive limitations given hereinafter on the contents of the various gas streams are satisfied, and are treated by conventional techniques to insure the absence of detrimental constituents therefrom. Furthermore, it is to be noted that the temperatures given hereinafter for each of the steps refer to the temperature of the gas stream used therein just before it contacts the catalyst.

According to the present invention, the first step of the regeneration procedure involves subjecting the deactivated catalyst to contact with a first gaseous mixture consisting essentially of about 0.5 to about 2.0 vol. percent $O_2$, about 0.1 to about 4 vol. percent $H_2O$, and an inert gas such as nitrogen, helium, carbon dioxide, etc. The conditions utilized in this step are: a temperature of about 375 to about 500° C. with best results obtained at about 400° C., a pressure sufficient to maintain the flow of this first gaseous mixture through the zone containing the catalyst and preferably about 1 to about 7 atm., and a gas hourly space velocity (defined as the volume rate of flow of the gas stream per hour at standard conditions divided by the volume of the bed of catalyst particles) of about 100 to about 25,000 hr.$^{-1}$. Preferably, this first step is performed for a first period sufficient to substantially remove carbonaceous materials from the catalyst. In general, depending obviously upon the amount of carbonaceous materials present on the catalyst, a first period of about 5 to about 30 hours is adequate with best results typically obtained in about 20 to about 30 hours.

The second step of the regeneration method involves subjecting the catalyst resulting from the first step to contact with a second gaseous mixture consisting essentially of about 0.5 to about 2 vol. percent $O_2$, about 0.1 to about 4 vol. percent $H_2O$, and an inert gas which is typically nitrogen. The temperature utilized in this second step is relatively high compared to that used in the first step, and is selected from the range of about 500 to about 550° C. The other conditions utilized in this step are preferably the same as used in the first step. The duration of this step is preferably about 0.5 to about 5 hours with excellent results usually obtained in about 0.5 to about 2 hours. In fact, a preferred embodiment of this step involves the use of a temperature of about 500 to about 510° C. and a pressure of about 1 to about 7 atm. for a contact time of about .5 to about 2 hours. The function of this second step is to remove trace amounts of carbonaceous materials which were not burned off during the first step and to prepare the catalyst for the rather severe conditions to which it is exposed in the next step.

The third step involves subjecting the catalyst resulting from the second step to contact with a third gaseous mixture consisting essentially of about 10 to about 25 vol. percent $O_2$, about .1 to about 4 vol. percent $H_2O$, and an inert gas which is typically nitrogen. In general, the preferred mode for changing from the second step to the third step involves a gradual increase in the amount of oxygen of the gaseous mixture being charged to the zone containing the catalyst, although in some cases with experience this transition can be a relatively abrupt one. The purpose of this gradual transition is to prevent the development of a substantial temperature rise in the catalyst bed due to incomplete removal of carbonaceous material during the first and the second steps. This third step is generally conducted for a period of about 1 to 5 hours at a temperature of about 500 to about 550° C. Once again, the other conditions utilized are preferably identical to those given above in the discussion of the first step. Excellent results are obtained in this step when an air stream (i.e. nitrogen containing about 21 vol. percent $O_2$) containing about .1 to about 4 vol. percent $H_2O$ is used for about 1 to 3 hours at a temperature of about 500 to 510° C. and at a pressure of about 1 to about 7 atm. The function of this third step is essentially to restore the metallic components of the catalyst to a highly oxidized state wherein I have determined the catalyst will be receptive to the following halogen adjustment step.

The halogen adjustment step involves subjecting the catalyst resulting from the third step to contact with a fourth gaseous mixture comprising about 1 to about 30 vol. percent $H_2O$ and about .05 to about 5 vol. percent of a halogen or a halogen-containing compound and air or an inert gas such as nitrogen. In fact, a preferred gaseous mixture for use in this step comprises an air stream having water and halogen or a halogen-containing compound admixed therewith. Although a halogen gas such as chlorine or fluorine may be used in this step, it is generally more convenient to employ a halogen-containing compound which upon exposure to the conditions utilized in this step is decomposed to form the corresponding hydrogen halide. Best results are obtained in this step when the halogen-containing compound is hydrogen chloride or hydrogen fluoride. In fact, as will be shown in the example, a preferred procedure when the halogen component of the catalyst is chlorine involves the injection of an aqueous solution of hydrogen chloride into the air stream used in an amount sufficient to result in a gaseous mixture comprising about 1 to 30 vol. percent $H_2O$, about .05 to about 5.0 vol. percent HCl and air. The mole ratio of the halogen to water used in this step is not critical and may be varied over a relatively broad range within the concentration limitation given above for the fourth gaseous mixture. This fourth step is preferably conducted at a temperature of about 400 to about 550° C. and at a pressure of about 1 to about 7 atm. for a period of about 1 to about 10 hours, with excellent results obtained in a period of about 3 to 5 hours at a temperature of about 525° C. The purpose of this step is to increase the halogen content of the catalyst and restore it to a value of about .1 to about 1.5 wt. percent of the catalyst and preferably about .4 to about .9 wt. percent of the regenerated catalyst, calculated on an elemental basis.

At the end of the halogen adjustment step, the catalyst bed is purged with nitrogen or another inert gas to displace oxygen and water therefrom for a period of time which can be easily determined by monitoring the effluent gases from the zone containing the catalysts to determine when they are substantially free of oxygen and water.

Following this purge step, the final essential step of the present invention is commenced. It involves contacting the resulting catalyst with a substantially water-free hydrogen stream at a pressure of about 1 to about 7 atm. and at a temperature of about 400 to about 600° C. for a final period of about 0.5 to about 5 hours. The preferred conditions for this step are a temperature of 525 to 575° C. for a period of 0.5 to 2 hours. Once again, the pressure and gaseous rates utilized for this step are preferably identical to those reported in conjunction with the discussion of the first step. The purpose of this reduction step is to reduce the metallic components essentially to an elemental state to produce a regenerated catalyst having activity, selectivity, and stability characteristics comparable to those possessed initially by the fresh catalyst.

Following this reduction step, the hydrocarbon conversion process in which the catalyst is utilized may be restarted by once again charging the hydrocarbon stream in the presence of hydrogen to the zone containing the catalyst at conditions designed to produce the desired product. In the preferred case, this involves reestablishing reforming conditions within the zone containing the catalyst.

The following example is given to illustrate further the regeneration method of the present invention and to indicate the benefits to be afforded through the utilization thereof. It is understood that the example is given for the sole purpose of illustration.

drogen (containing less than 1 vol. p.p.m. of water) at a temperature of about 1020° F. for about 1 hour. Thereafter, the catalyst particles were presulfided with a mixture of $H_2$ and $H_2S$ at a temperature of about 1000° F.

Three catalysts of different platinum and rhenium content were prepared by this procedure. They are designated as catalysts AF, BF, and CF in Table I where their compositions are given on a wt. percent of element basis. Also shown in Table I are analyses of the same catalysts after they had been deactivated by the deposition of carbonaceous materials while being used in a reforming process. The deactivated catalysts corresponding to the catalysts AF, BF, and CF are designated AD, BD, and CD, respectively.

TABLE I.—COMPOSITION OF CATALYSTS

| Catalyst designation | Weight percent | | | |
|---|---|---|---|---|
| | Pt | Re | Cl | S | C |
| AF | .55 | .2 | .85 | .1 | 0 |
| AD | 1.55 | 1.2 | .74 | .01 | 4.5 |
| BF | .2 | .2 | .9 | .1 | 0 |
| BD | 1.2 | 1.2 | .89 | .03 | 3.4 |
| CF | .375 | .375 | .9 | .1 | 0 |
| CD | 1.375 | 1.375 | .85 | .03 | 7.6 |

[1] Based on carbon-free catalyst.

The deactivated catalysts—AD, BD, and CD—were separately regenerated by a sequence of steps which comprise a preferred embodiment of the present invention to yield regenerated catalysts—AR, BR, and CR. A summary of the conditions and gas streams used in each of the steps are given in Table II. In view of the fact that each of these steps has been previously explained in detail, the description thereof will not be repeated here.

TABLE II.—SUMMARY OF REGENERATION METHOD

| Step No. | Composition of gas stream, vol. percent | T. ° C. | GHSV, hr.$^{-1}$ | P. p.s.i.g. | Time, hr. |
|---|---|---|---|---|---|
| 1 | 1% $O_2$, 0.15% $H_2O$, $N_2$ | 400 | 310 | 5 | 18-24 |
| 2 | 1% $O_2$, 0.15% $H_2O$, $N_2$ | 510 | 310 | 5 | 1 |
| 3 | 21% $O_2$, 3% $H_2O$, $N_2$ | 510 | 300 | 5 | 2 |
| 4 | 0.3% HCl, 18.5% $H_2O$, 17.0% $O_2$, and $N_2$. | 525 | 1300 | 5 | 4 |
| 5 | $N_2$ | 525 | 300 | 5 | 0.5 |
| 6 | Dry $H_2$ | 566 | 300 | 5 | 1 |

EXAMPLE

This example demonstrates the benefits associated with the regeneration method of the present invention by contrasting the results obtained in an accelerated reforming stability test with the fresh, undeactivated catalyst and with the regenerated catalyst produced by the present invention. In order to study the response of catalysts of varying rhenium and platinum composition to the subject regeneration method, three catalysts of different compositions were evaluated.

The catalysts were all manufactured using 1/16 inch spherical particles of a gamma alumina carrier material prepared by the method disclosed in U.S. Pat. No. 2,620,314. The carrier material had an apparent bulk density of about 0.5 gm./cc., a pore volume of about 0.4 cc./gm., and a surface area of about 160 m.$^2$/gm.

The spherical particles were then impregnated with a solution containing chloroplatinic acid, hydrogen chloride, and perrhenic acid to amounts sufficient to result in the desired concentration of platinum and rhenium in the finished catalysts. The impregnated spheres were then dried to about 250° F. for about 2 hours, and thereafter subjected to high temperature oxidation treatment with an air stream containing $H_2O$ and HCl for about 3 hours at 975° F.

After this oxidation treatment, the catalyst particles were contacted with a stream of substantially pure hy- The resulting regenerated catalysts—AR, BR, and CR—were then subjected to a high stress reforming stability test, and the results obtained compared with similar tests performed on the corresponding fresh catalysts AF, BF, and CF.

These stability tests were performed in a laboratory scale reforming plant comprising a reactor containing a fixed bed of the catalyst, a hydrogen separator, a high surface area sodium dryer, a debutanizer column and other conventional equipment such as pumps, compressors, heating and cooling means, etc., the details of which are well known to those skilled in the art.

The flow scheme utilized in this laboratory scale reforming plant is a follows: (1) the charge stock and hydrogen are commingled, heated to conversion temperature and passed into the reactor; (2) an effluent stream is withdrawn from the reactor, cooled to about 55° F., and passed to the hydrogen separator wherein a hydrogen-rich gas separates from a hydrocarbon liquid phase; (3) the hydrogen-rich gas phase is withdrawn and a portion of it vented from the system in order to maintain pressure control; another portion is passed through the high surface area sodium dryer, recompressed, and ultimately recycled to the reactor; and, (4) the liquid phase from the separator is passed to the debutanizer column wherein light ends are taken overhead and a $C_5+$ reformate recovered as bottoms.

The characteristics of the charge stock used in the accelerated stability test are given in Table III.

TABLE III.—ANALYSIS OF HEAVY KUWAIT NAPHTHA

| | |
|---|---|
| API gravity, at 50° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, p.p.m. | 5.9 |
| Octane No., F-1 clear | 40.0 |

The reforming stability test consists of a line-out period followed by six test periods of 24 hours. The conditions utilized in the tests with the various catalysts were as follows: for catalysts AF and AR, a pressure of 100 p.s.i.g., a mole ratio of hydrogen to hydrocarbon of 9:1, a LHSV of 1.5 hr.$^{-1}$ and a temperature which is continuously adjusted to achieve a target octane of 100 F-1 clear for the $C_5+$ reformate; and for catalysts BF, BR, CF, and CR, a pressure of 100 p.s.i.g., a mole ratio of hydrogen to hydrocarbon of 7:1, a LHSV of 1.5 hr.$^{-1}$, and a temperature which is continuously adjusted in order to achieve a target octane of 102 F-1 clear.

The results of these comparison tests are given in Table IV in terms of temperature necessary during each period to achieve target octane and the $C_5+$ yield, on a vol. percent of charge basis, recovered during each test period.

that the stability characteristics for the fresh and regenerated catalysts are comparable.

I claim as my invention:

1. A method for regenerating a deactivated hydrocarbon conversion catalyst comprising a combination of a platinum group component, a rhenium component, and a halogen component with an alumina carrier material, the catalyst having been deactivated by deposition of carbonaceous materials thereon during a previous contacting with a hydrocarbon charge stock at an elevated temperature, said method comprising the steps of:

(1) contacting the deactivated catalyst with a first gaseous mixture consisting essentially of about 0.5 to about 2.0 vol. percent $O_2$, about 0.1 to about 4 vol. percent $H_2O$, and an inert gas at a pressure sufficient to maintain flow of said mixture through the catalyst and at a temperature of about 375 to about 500° C. for a first period sufficient to substantially remove said carbonaceous materials;

(2) subjecting the catalyst resulting from step (1) to contact with a second gaseous mixture consisting essentially of about 0.5 to about 2 vol. percent $O_2$, about 0.1 to about 4 vol. percent $H_2O$, and an inert gas for a second period of about .5 to 5 hours at a temperature of about 500 to about 550° C., and at a pressure sufficient to maintain flow of said mixture through the catalyst;

(3) contacting the catalyst resulting from step (2) with a third gaseous mixture consisting essentially of about 10 to about 25 vol. percent $O_2$, about .1 to about 4 vol. percent $H_2O$, and an inert gas for a third period of about 1 to 5 hours at a temperature of about 500 to 550° C. and at a pressure sufficient

TABLE IV.—COMPARISON OF FRESH AND REGENERATED CATALYST IN REFORMING TEST

| | Catalyst | | | | | | | | | | | |
|---|---|---|---|---|---|---|---|---|---|---|---|---|
| | AF | | AR | | BF | | BR | | CF | | CR | |
| Period No. | Temp., °F. | $C_5+$vol. percent | Temp., °F. | $C_5+$vol. percent | Temp., °F. | $C_5+$vol. percent | Temp., °F. | $C_5+$vol. percent | Temp., °F. | $C_5+$vol. percent | Temp., °F. | $C_5+$vol. percent |
| 1 | 962 | | 977 | 75.1 | 972 | 72.9 | 987 | 72.7 | 978 | 71.9 | 974 | 71.0 |
| 2 | 972 | 76.0 | 987 | 76.6 | 986 | 73.4 | 990 | 75.2 | 990 | 74.7 | 991 | 72.7 |
| 3 | 987 | 76.5 | 997 | 77.7 | 995 | | 1001 | 74.4 | 999 | 74.7 | 1006 | |
| 4 | 985 | 76.9 | 1000 | 76.5 | 999 | 74.2 | 1009 | 74.1 | 1003 | 75.0 | | |
| 5 | 988 | 77.0 | 1000 | 76.7 | 1004 | 74.2 | 1022 | 73.0 | 1009 | 74.5 | 1025 | 75.6 |
| 6 | 991 | 77.0 | | | 1008 | 74.2 | 1032 | 73.7 | 1019 | 73.0 | 1029 | |

As previously explained, the temperature required to make octane, at constant conditions for the same charge stock, is a good measure of activity of the catalyst. On this basis, it can be determined from Table IV that the regenerated catalysts AR, BR, and CR required a temperature to make octane which was comparable to that used with the corresponding fresh catalysts AF, BF, and CF. It is to be noted that the regenerated catalysts are not precisely equivalent to the fresh catalysts: that is, they require a slightly higher temperature to make octane; but this is generally to be expected for a regenerated catalyst. Of much greater significance is the degree of approach of the regenerated catalyst to fresh catalyst performance, especially in view of the fact that the application of prior art burning technique to these catalysts produced regenerated catalysts which were considered to be substantially and permanently deactivated and to be of no further utility for reforming.

Similarly, $C_5+$ yield at octane is a precise indicator of catalyst selectivity for reforming reactions, and by comparing the $C_5+$ yield data given in Table IV for the fresh and deactivated catalysts, it is manifest that the regenerated catalyst have selectivity characteristics which are comparable to the fresh catalysts.

Insofar as stability is concerned, the rate of change of temperature necessary to make octane and of $C_5+$ yield with time are commonly used to measure this performance characteristic. From Table IV it can be ascertained to maintain flow of said mixture through the catalyst.

(4) subjecting the catalyst resulting from step (3) to contact with a fourth gaseous mixture comprising about 1 to about 30 vol. percent $H_2O$ and about .05 to about 5 vol. percent of a halogen or a halogen-containing compound and air or an inert gas for a fourth period of about 1 to about 10 hours at a temperature of about 400 to about 550° C. and at a pressure sufficient to maintain flow of said mixture through the catalyst;

the aforesaid gaseous mixtures of each of steps 1 through 4 inclusive being substantially free of sulfur compounds;

(5) purging oxygen and water from contact with the catalyst from step (4) with an inert gas stream; and (6) subjecting the catalyst resulting from step (5) to contact with a substantially water-free and sulfur compound-free hydrogen stream at a temperature of about 400 to about 600° C. for a final period of about 0.5 to about 5 hours, thereby producing a regenerated hydrocarbon conversion catalyst having activity, selectivity, and stability characteristics comparable to those possessed initially by the fresh catalyst.

2. A method as defined in claim 1 wherein said platinum group component is platinum or a compound of platinum.

3. A method as defined in claim 1 wherein said platinum group component is palladium or a compound of palladium.

4. A method as defined in claim 1 wherein said halogen component is chlorine or a compound of chlorine.

5. A method as defined in claim 1 wherein said halogen component is fluorine or a compound of fluorine.

6. A method as defined in claim 1 wherein said alumina carrier material is gamma or eta alumina.

7. A method as defined in claim 1 wherein said catalyst contains, on an elemental basis, about .1 to about 1.5 wt. percent halogen, about 0.01 to about 1.0 platinum group metal and about 0.01 to about 1.0 wt. percent rhenium.

8. A method as defined in claim 1 wherein said deactivated catalyst contains about 0.05 to about 0.5 wt. percent of a sulfur component.

9. A method as defined in claim 1 wherein said deactivated catalyst comprises a combination of a platinum component, a chlorine component, and a rhenium component with an alumina carrier material in amounts sufficient to result in a catalyst containing, on an elemental basis, about 0.1 to about 1.5 wt. percent chlorine, about 0.01 to about 1.0 wt. percent platinum and about 0.01 to about 1.0 wt. percent rhenium.

10. A method as defined in claim 1 wherein the halogen component of the catalyst is chlorine and the halogen-containing compound used in step (4) is hydrogen chloride.

11. A method for regenerating a deactivated hydrocarbon conversion catalyst comprising a combination of a platinum component, a rhenium component, and a chlorine component with an alumina carrier material, said components being present in amounts sufficient to provide about .1 to about 1.5 wt. percent chlorine, about 0.01 to about 1.0 wt. percent platinum, and about 0.01 to about 1.0 wt. percent rhenium, the catalyst having been deactivated by deposition of carbonaceous materials thereon during a previous contacting with a hydrocarbon charge stock at elevated temperatures, said method comprising the steps of:

(1) contacting the deactivated catalyst with a first gaseous mixture consisting essentially of about 0.5 to about 2.0 vol. percent $O_2$, about 0.1 to about 4 vol. percent $H_2O$, and nitrogen at a pressure sufficient to maintain flow of said mixture through the catalyst and at a temperature of about 400° C. for a first period sufficient to substantially remove said carbonaceous materials;

(2) subjecting the catalyst from step (1) to contact with a second gaseous mixture consisting essentially of about .5 to 2 vol. percent $O_2$, about .1 to about 4 vol. percent $O_2$, and nitrogen for a second period of about .5 to about 2 hours at a temperature of about 500 to about 510° C. and at a pressure sufficient to maintain flow of said mixture through the catalyst;

(3) contacting the catalyst resulting from step (2) with a third gaseous mixture consisting essentially of about 21 vol. percent $O_2$, about .1 to about 4 vol. percent $H_2O$, and nitrogen for a third period of about 1 to 3 hours at a temperature of about 500 to 510° C. and at a pressure sufficient to maintain flow of said mixture through the catalyst;

(4) subjecting the catalyst resulting from step (3) to contact with a fourth gaseous mixture comprising about 1 to about 30 vol. percent $H_2O$, about .05 to about 5 vol. percent hydrogen chloride, and air for a fourth period of about 3 to 5 hours at a temperature of about 525° C. and at a pressure sufficient to maintain flow of said mixture through the catalyst;

the aforesaid gaseous mixtures of each of steps 1 through 4 inclusive being substantially free of sulfur compounds;

(5) purging oxygen and water from contact with the catalyst from step (4) with a nitrogen stream; and (6) subjecting the catalyst resulting from step (5) to contact with a substantially water-free and sulfur compound-free hydrogen stream at a temperature of about 525 to about 575° C. for a final period of about 0.5 to about 2 hours, thereby producing a regenerated hydrocarbon conversion catalyst having activity, selectivity, and stability characteristics comparable to those possessed initially by the fresh catalyst.

12. A method as defined in claim 1 wherein the pressure of each of steps (1) through (4) inclusive is in the range of about 1 to about 7 atm.

13. A method as defined in claim 11 wherein the pressure of each of steps (1) through (4) inclusive is in the range of about 1 to about 7 atm.

References Cited

UNITED STATES PATENTS

| | | | |
|---|---|---|---|
| 2,916,440 | 12/1959 | Hogin et al. | 208—140 |
| 3,243,384 | 3/1966 | Raarup, Jr. | 252—415 |
| 3,296,118 | 1/1967 | Czajkowski | 208—139 X |
| 3,407,135 | 9/1968 | Brown | 252—415 X |
| 3,496,096 | 2/1970 | Klukslahl | 208—140 |

DANIEL E. WYMAN, Primary Examiner

P. E. KONOPKA, Assistant Examiner

U.S. Cl. X.R.

208—140; 252—419